United States Patent [19]

Kozuki et al.

[11] 4,091,395
[45] May 23, 1978

[54] ELECTRICAL POWER SUPPLY TRANSFER SYSTEM FOR A CAMERA

[75] Inventors: Susumu Kozuki, Yokohama; Akio Sunouchi, Tokyo; Yoshiaki Watanabe, Fujisawa, all of Japan

[73] Assignee: Canon Kabushiki Kaisha, Tokyo, Japan

[21] Appl. No.: 784,523

[22] Filed: Apr. 4, 1977

[30] Foreign Application Priority Data

Apr. 8, 1976 Japan ................................. 51/39631

[51] Int. Cl.$^2$ ............................. G03B 1/18; H02J 7/00
[52] U.S. Cl. .................................. 354/173; 354/60 R; 307/66
[58] Field of Search ............................. 354/27, 32–35, 354/60 R, 60 F, 127–129, 135, 145, 170–173, 202, 204–206; 352/121, 137, 169; 307/66, 86

[56] References Cited

U.S. PATENT DOCUMENTS

| | | | |
|---|---|---|---|
| 3,631,257 | 12/1971 | Behr et al. | 307/66 |
| 3,763,755 | 10/1973 | Kuramoto et al. | 354/173 |
| 3,853,396 | 12/1974 | Ogiso et al. | 354/173 |
| 3,947,855 | 3/1976 | Inoue et al. | 354/60 R X |
| 4,015,198 | 3/1977 | Iwashita et al. | 354/173 X |
| 4,041,514 | 8/1977 | Johnson | 354/173 X |
| 4,044,268 | 8/1977 | Hammel et al. | 307/66 |

*Primary Examiner*—L. T. Hix
*Assistant Examiner*—William B. Perkey
*Attorney, Agent, or Firm*—Toren, McGeady and Stanger

[57] ABSTRACT

In a combination of a photographic camera with an accessory equipment such as a motor drive unit attached thereto, when the voltage of a power source or battery provided in the camera for application to an automatic exposure control circuit thereof has fallen below a satisfactory operating level, a transfer switch is automatically operated to shift the connection of the exposure control circuit from the battery of the camera to an electrical power source or battery provided in the accessory equipment.

10 Claims, 2 Drawing Figures

ELECTRICAL POWER SUPPLY TRANSFER SYSTEM FOR A CAMERA

BACKGROUND OF THE INVENTION

1. Field of the Invention

This invention relates to photographic cameras, and more particularly to a camera having an automatic exposure control circuit with an electrical power supply transfer system rendering it possible to energize the exposure control circuit from either of two batteries, one of which is provided in the camera, and the other of which is provided in an accessory equipment such as a motor drive unit, as is selected in automatic response to the lowering of the voltage of the camera's battery below a satisfactory operating level.

2. Description of the Prior Art

The conventional electrical power systems for cameras having automatic exposure control apparatus have generally been designed to operate with a single battery of small size with small capacity. When the battery voltage has fallen below a satisfactory operating level, or when the operator has forgotten to have a battery mounted in his camera, the exposure control apparatus is maintained unintentionally de-energized. In the case of a camera having an electrically timed shutter, therefore, the actuation of a shutter release does not result in operation of a shutter electromagnet, thereby the shutter is caused to remain in either open or closed position, thus enabling the operator to make an exposure. In the case of a camera provided with electromagnetically operated actuating means for operation of the various internal mechanisms thereof, when the battery voltage is lowered from the satisfactory operating level, or when no battery is mounted in the camera, the internal mechanisms can not work to enable the operator to make an exposure. Although the camera can be rendered normally operative by replacing the old battery by new one, when it happens that the operator has no new batteries at hand, no further continuance of exposures can be made.

An object of the present invention is to overcome the above mentioned drawbacks of the conventional electrical power system, and to provide an electrical power supply transfer or changeover system for a photographic camera having electrically operated control means including automatic exposure control means as established in combination with an accessory equipment attached to the camera, so that when the voltage of the camera's battery has fallen below a satisfactory operating level, or when no battery is mounted as the operator has forgotten to do, the electrical power system is energized from the battery of the accessory euipment.

Another object is to detect the actual voltage of the electrical power source provided in the camera to produce an actuating signal by which a transfer switch is operated so as to shift the connection of the power system from the electrical power source of the camera to an electrical power source provided in an accessory equipment attached to the camera.

These and other objects and features of the present invention will become apparent from the following detailed description taken in conjunction with the accompanying drawings in which:

DESCRIPTION OF THE PREFERRED EMBODIMENTS

Figure 1:
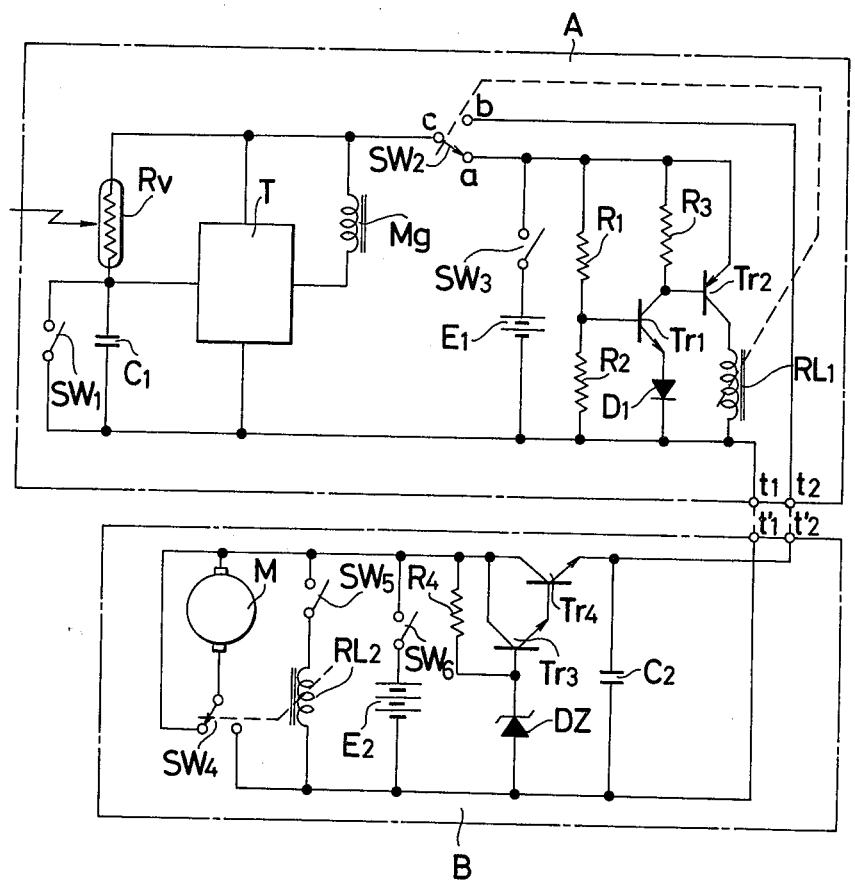
FIG. 1 is a schematic circuit diagram, partly in block form, of one embodiment of an electrical power supply transfer system according to the present invention as established in the combination of a camera having an electrically timed shutter with a motor drive unit attached thereto.

Referring to FIG. 1, there is shown an example of the combination of a camera having an electrically timed shutter with a motor drive unit attached thereto. The circuitry of the camera is shown in a dot-and-dash line block A, and that of the motor drive unit in a dot-and-dash block B, the camera and the unit being provided with respective pairs of interconnection terminals $t_1$, $t_2$ and $t_1'$, $t_2'$ arranged to be brought into contact with each other when the unit is attached to the camera. In addition thereto, there are provided a not shown mechanical linkage through which the film advancing and shutter releasing mechanisms are driven by an electrical motor M of the unit.

Block A includes a photo-sensitive element Rv, a timing capacitor $C_1$ connected in series to element Rv and a trigger circuit T (for example, of Schmitt type) responsive to the timing circuit Rv, $C_1$ for energizing and deenergizing the solenoid of a shutter electromagnet Mg from an electrical power source or battery $E_1$ through a mechanical switch $SW_3$ arranged to be closed when a not shown shutter release button is depressed to a first stroke. Connected across timing capacitor $C_1$ is a start switch $SW_1$ arranged to be opened when the shutter release button is depressed from the first to a second stroke.

The electrical power supply transfer system of the invention comprises a circuit transfer or changeover switch $SW_2$ which is a single pole double throw switch that is arranged to cooperate with a relay $RL_1$ in such a manner that when the battery voltage as detected by a detecting circuit is dropped down from a satisfactory operating level, switch $SW_2$ is moved by relay $RL_1$ from its "a" position to its "b" position. The detecting circuit comprises a resistor voltage divider of resistors $R_1$ and $R_2$ connected across the battery $E_1$ through switch $SW_3$, a first transistor $Tr_1$ having a base connected to the output of voltage divider $R_1$, $R_2$, having collector connected through a resistor $R_3$ to the positive bus, and having an emitter connected through a diode $D_1$ to the negative bus, and a second transistor $Tr_2$ having a base connected to a point on connection between resistor $R_3$ and collector of transistor $Tr_1$, having an emitter connected to the positive bus, and having a collector connected through the coil of relay $RL_1$ to the negative bus.

Block B includes the winding of motor M connected at one end thereof to the positive terminal of a battery $E_2$ through a main switch $SW_6$, the opposite end of which is connected to the negative terminal of battery $E_2$ through a switch $SW_4$ arranged to cooperate with a relay $RL_2$ controlling starting and stopping operating of motor M, the coil of relay $RL_2$ being connected along with an actuator switch $SW_5$ therefor between the positive and negative buses.

Further included in block B is a constant voltage circuit comprising a resistor $R_4$ connected between the positive bus and the cathode of a Zener diode DZ having an anode connected to the negative bus, a first transistor $Tr_3$ having a base connected to a point on connection between resistor $R_4$ and Zener diode DZ and having a collector connected to the positive bus, a second transistor $Tr_4$ having a base connected to the emitter of first transistor $Tr_3$, having a collector connected to the positive bus and having an emitter connected to one interconnection terminal $T'_2$, and a capacitor $C_2$ connected between the emitter of second transistor $Tr_4$ and the negative bus which is connected to the other interconnection terminal $t'_1$. One interconnection terminal $t_2$ of the camera is connected by way of a lead to the fixed contact, b, of the transfer switch $SW_2$, while the other fixed contact, a, is connected to the positive bus of the power system of the camera.

The operation of the system of FIG. 1 is as follows. Assuming that the voltage of the battery $E_1$ in the cammera camera is above the satisfactory operating level, when a not shown shutter release button is depressed to the first stroke, switch $SW_3$ is closed to apply the voltage of battery $E_1$ to the detecting circuit. As the output voltage of the divider of resistors $R_1$ and $R_2$ is above a predetermined level, the first and second transistors $Tr_1$ and $Tr_2$ are rendered conducting to energize the relay $RL_1$, thereby the transfer switch $SW_2$ is set in "a" position, permitting the connection of the battery $E_1$ to the shutter control circuit. Upon further depression of the shutter release button to the second stroke, the start switch $SW_1$ is opened to initiate charging of the timing capacitor $C_1$ through the photo-sensitive element Rv from the battery $E_1$. At the termination of duration of an exposure time depending upon the light value as sensed by the photosensitive element Rv, trigger circuit T is actuated to operate the shutter electromagnet Mg, thereby the shutter is closed.

Alternatively assuming that the voltage of the battery $E_1$ has fallen below the satisfactory operating level, when the shutter button is depressed, the voltage divider produces a lower output voltage than the predetermined level so that the first and second transistor $Tr_1$ and $Tr_2$ are turned off to deenergize the relay $RL_1$, thereby the transfer switch $SW_2$ is set from "a" position to "b" position where the voltage of the battery $E_2$ in the motor drive unit B after lowered by the constant voltage circuit to a level equal to or slightly higher than the above-identified satisfactory operating level is applied through the interconnection terminals $t_1 - t'_1$ and $t_2 - t'_2$ and through the transfer switch $SW_2$ to the shutter control circuit of the camera A, provided that the main switch $SW_6$ of the unit B is closed. As the shutter release button may be associated with the actuator switch $SW_5$, when the motor M is energized from the battery $E_2$, the constant voltage circuit functions to maintain the voltage which is applied to the shutter control circuit constant at the level.

Even when it has happened that the operator overlooks to mount the battery $E_1$ in the camera, the shutter control circuit goes to operate with the electrical power supplied from the motor drive unit.

Figure 2:
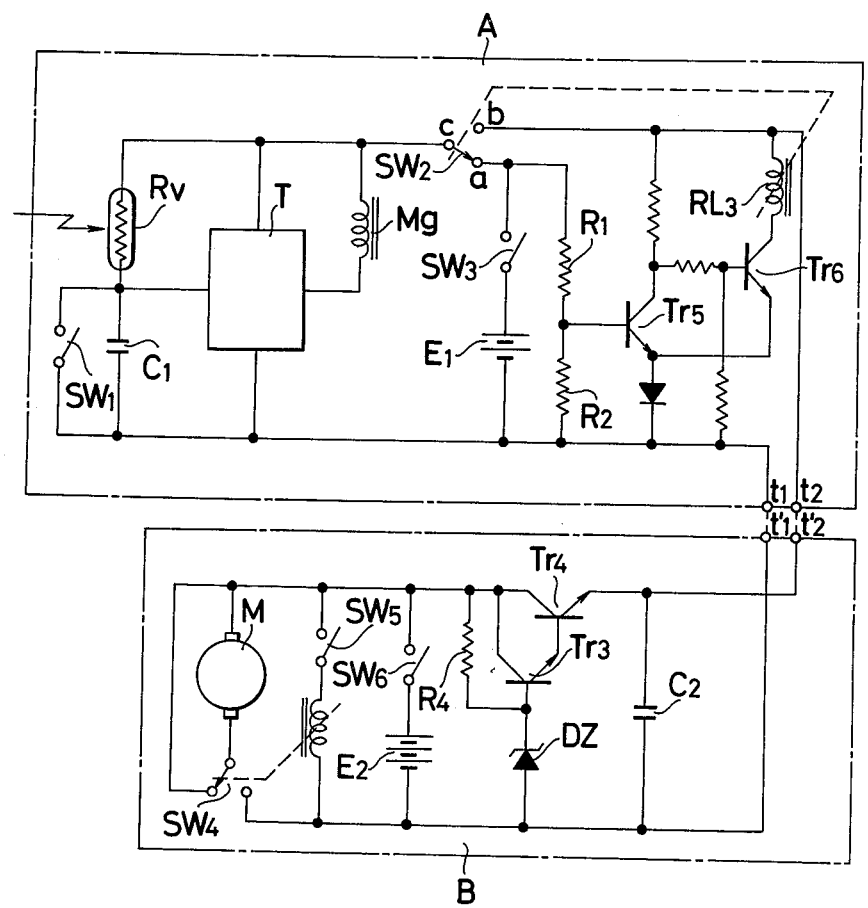
FIG. 2 is a similar diagram showing another embodiment of the invention.

FIG. 2 shows another embodiment of the invention which is different from FIG. 1 embodiment in that the voltage detecting circuit for the battery $E_1$ in the camera is to be energized from the battery $E_2$ of the motor drive unit. When the motor drive unit is detached from the camera, the first and second transistors $Tr_5$ and $Tr_6$ of the detecting circuit are rendered inoperative, causing no current to flow through the coil of electromagnetic relay $RL_3$ so that the transfer switch $SW_2$ is in "a" position where the power supply to the shutter control circuit is effected from the only battery $E_1$ through the main switch $SW_3$ and through the connection of the movable contact "c" with the fixed contact "a" of the transfer switch $SW_2$. Consequently, when the voltage of the battery $E_1$ has fallen below the satisfactory operating level, the operator can not use the camera in making exposures.

With the camera of FIG. 2 equipped with the motor drive unit of FIG. 1, when the main switch $SW_6$ of the unit is closed, the output voltage of the constant voltage circuit which is equal to or slightly higher than the satisfactory operating level for the shutter control circuit as mentioned before is applied to the voltage detector as well as to the fixed contact "b" of the transfer switch $SW_2$. Assuming that the voltage of the camera's battery $E_1$ is above the satisfactory operating level, the first and second transistors $Tr_5$ and $Tr_6$ of the detecting circuit are in "ON" and "OFF" positions respectively so that no energization of relay $RL_3$ is effected. When the voltage of the camera's battery $E_1$ has fallen below the satisfactory operating level, transistors $Tr_5$ and $Tr_6$ are turned off and on respectively to energize the relay $RL_3$, thereby the transfer switch $SW_2$ is set from "a" to "b" position where the shutter control circuit is energized on operation of the constant voltage circuit of the motor drive unit. An advantage of this embodiment is that the premature consumption of the energy of the camera's battery $E_1$ which would be otherwise resulted from the energization of the voltage detecting circuit can be avoided. This is of importance for it is impossible to employ as $E_1$ a battery of large capacity.

In an event the operator may forget to mount the battery $E_1$ in the camera, he is enabled to make exposures with such camera provided that the motor drive unit is attached thereto. When the main switch $SW_6$ of the unit is closed, the relay $RL_3$ is energized to set the transfer switch $SW_2$ in "b" position.

The present invention has been described in connection with a schematic example which of course can be changed in many ways. For example, instead of using the motor drive unit B, it is possible to use a strobo unit or any other accessory equipment provided that it carries an electrical power source. Instead of providing the constant voltage circuit in the motor drive unit, it is possible to provide a camera having such a constant voltage circuit incorporated therein. Further, the automatic actuation of the transfer switch may be changed to a manual actuation with the help of an indicator by which the operator is aware if the battery voltage has fallen the satisfactory operating level.

It will be seen from the foregoing description that the present invention provides a novel electrical power supply transfer system for an electrically operated camera enabling the operator to make exposure even when no satisfactory power supply is available in the camera, as the electrical power source of the accessory equipment such as a motor drive unit can be utilized as the power source for the camera.

What is claimed is:

1. An electrical power source changeover system of an automatic exposure control camera provided with an accessory unit comprising;
   * an accessory unit
     said unit including:
     (a) first power supply means; and
     (b) an electrical circuit which is to be rendered operative by power supply from said first power supply means;
   * a camera body
     said camera body including:

(c) second power supply means;
(d) exposure control means which is to be rendered operative by power supply from said second power supply means;
(e) detecting means for detecting whether or not the power supply voltage of said second power supply means is above a predetermined level at which said exposure control means is operable; and
(f) changeover means positioned between said second power supply means and exposure control means, said means being switchable between a first position where, based on the detected result of said detecting means, said exposure control means is brought into connection with said second power supply means, and a second position where said exposure control means is taken out of the connection with said second power supply means; and
* means for electrically connecting said accessory unit with said camera body,
  said means connecting said first power supply means to the second position of said changeover means so that when said changeover means is moved to the second position, the power supply voltage of the first power supply means is applied to said exposure control circuit.

2. An electrical power source changeover system according to claim 1, wherein said detecting means has control means for controlling changeover operation of said changeover means, whereby when the power supply voltage of said second power supply means is lower than the predetermined level, said control means moves said changeover means to the second position.

3. An electrical power source changeover system according to claim 2, wherein said accessory unit is removably attached to said camera body, so that only when the accessory unit is attached to the camera body, the power supply voltage of the first power supply means is applied to said detecting means, thereby the operation of the control means is made possible.

4. An electrical power source changeover system according to claim 1, wherein there is further included means for converting the power supply voltage of said first power supply means to a constant voltage corresponding to the operating voltage of the exposure control means, said means applying the power supply voltage of the first power supply means after converted to the constant voltage to said second position of said changeover means.

5. An electrical power source changeover system of an automatic exposure control camera to which an accessory unit with a power source voltage is attachable including:
* power supply means;
* exposure control means which is to be rendered operative by power supply from said power supply means;
* detecting means for detecting whether or not the power supply voltage of said power supply means is above a predetermined level at which said exposure control means is operable;
* changeover means positioned between said power supply means and exposure control means, said means being switchable between a first position where, based on the detected result of said detecting means, said exposure control means is brought into connection with said power supply means, and a second position where the exposure control means is disconnected from the power supply means; and
* terminals to which the power source voltage of said accessory unit is applied, said terminals being to be connected to the second position of said changeover means.

6. An electrical power source changeover system according to claim 5, wherein said detecting means has control means for controlling changeover operation of said changeover means, whereby said control means moves said changeover means to the second position when the power supply voltage of said power supply means is lower than the predetermined level.

7. An electrical power source changeover system of an automatic exposure control camera to which a motor drive unit is attachable comprising:
* a motor drive unit, said unit including;
  (a) first power supply means;
  (b) drive control means which is to be rendered operative by power supply from said first power supply means; and
  (c) a first terminal to which the power supply voltage of said first power supply means is applied;
* a camera body to which said motor drive unit is to be attached, said camera body inclduing:
  (d) second power supply means;
  (e) exposure control means which is to be rendered operative by power supply from said second power supply means;
  (f) detecting means for detecting whether or not the power supply voltage of said second power supply means is above a predetermined level at which said exposure control means is operable;
  (g) a second terminal for electrical contact with said first terminal;
  (h) changeover means positioned between said second power supply means and exposure control means; said means being switchable between a first position where said exposure control means is brought into connection with said second power supply means and a second position where said exposure control means is brought into the connection with said second terminal; and
  (i) changeover control means for controlling changeover operation of said changeover means thereby said means moves said changeover means to a second position when the power supply voltage of said second power supply means as detected by said detecting means is lower than the predetermined level.

8. An electrical power source changeover system according to claim 7, wherein said motor drive unit further includes means for converting the power supply voltage of said first power supply means to a constant voltage corresponding to the operating voltage of the exposure control means, said constant voltage means applying the power supply voltage of said first power supply means after converted to the constant voltage to said first terminal.

9. An electrical power source changeover system according to claim 8, wherein the first power supply means has a power switch, whereby when said power switch is closed, the power supply to said constant voltage means is performed.

10. An electrical power source changeover system according to claim 9, wherein said changeover control means is an electromagnetic relay which is to be rendered operative when said power switch is closed.

* * * * *